United States Patent Office 3,703,464
Patented Nov. 21, 1972

3,703,464
TREATMENT OF OIL SPILLS
Richard L. Ferm, Lafayette, Calif., assignor to Chevron Research Company, San Francisco, Calif.
No Drawing. Filed May 20, 1971, Ser. No. 145,487
Int. Cl. C02b 9/02
U.S. Cl. 210—40      10 Claims

ABSTRACT OF THE DISCLOSURE

A process for treating petroleum product spills is disclosed, whereby coconut husk material is spread on the spill to absorb it. When the spill is on fresh or salt water in the form of a "slick," the coconut husk material coagulates the film, keeps it from sinking, and forms a mass which lends itself to easy removal from the water by mechanical pickup and the like.

BACKGROUND OF THE INVENTION

Field of the invention

A problem of ever-increasing concern in the world today is the growing threat from oil tanker spillage, offshore oil well leaks, and the like. In addition to the major oil spills, such as the Torrey Canyon incident and the Santa Barbara Channel oil well leak, small oil leaks and spills on fresh and salt water as well as on land are common occurrences.

The last few years have seen the mounting of large effort to develop new methods and techniques for dealing with these spills. The development of successful techniques has been limited. This is evident from the fact that one of the main methods still being used to "mop up" the oil is the use of ordinary straw. Various mechanical booms, filters, vacuum devices and chemical compression agents have also been used. The economics of using these devices are, in many cases, not good and their success is limited. Straw, which remains the mainstay oil-absorbing agent, is not readily available in many areas and, where available, can be expensive relative to its effectiveness as an oil-absorbing medium.

This invention is concerned wtih a method for more effectively absorbing petroleum products present on fresh or salt water in the form of slicks as well as simply acting as a "sponge" for petroleum product spills of all forms including those around land-based oil tanks and the like.

SUMMARY OF THE INVENTION

A process for treating petroleum product spills is disclosed whereby coconut husk material is spread on the spill to absorb it. When the spill is on fresh or salt water in the form of a "slick," the coconut husk material coagulates the film, keeps it from sinking, and forms a mass which lends itself to easy removal from the water by mechanical pickup and the like.

DETAILED DESCRIPTION OF THE INVENTION

The subject invention provides a process for cleanup of petroleum product spills on fresh or salt water or on land. By the term "petroleum product" is meant both crude oil as well as refined products such as residual fuel oils, bunker fuel, diesel fuel and other hydrocarbon liquids such as paint thinner, gasoline and the like of such a specific gravity as to float on water and of sufficiently low viscosity that it tends to spread to form a film.

By spreading coconut husk material on the surface of the spill, the spill is coagulated and easily cleaned up. When the spill is in the form of a slick on fresh or salt water, the coconut husk material (1) absorbs several times its own weight of the petroleum product thereby, (2) coagulating the slick and keep it from sinking and (3) forming a mass which lends itself to easy pickup by mechanical means and the like.

The coconut husk material soaked with the petroleum product can also be collected against a boom, mesh fence or the like.

The coconut husk material can also be used as a filter by placing the material between wire mesh screens and the like and passing the water containing the petroleum product through the filter.

The petroleum product can be partially recovered from the coconut husk material by mechanical pressing. Substantially, a complete recovery of crude oil and residual fuel oil can be obtained by extraction wtih a hydrocarbon solvent. Steam or hot water treatment may also be used to recover the crude oil from the soaked coconut husk material.

When the spill is in the form of a slick on fresh or salt water, the coconut husk material can be used in combination with other treatments. For instance, U.S. application entitled "Process for Treating Oil Slicks Using Chemical Agents," filed in the name of Richard L. Ferm on Feb. 25, 1971, teaches a class of chemical agents which act as oil film compression agents. The subject invention contemplates that petroleum product slicks can be first treated with a chemical oil film compression agent to control the size of the slick after which the coconut husk material can be applied to coagulate the petroleum product by absorbing it and preventing it from sinking. Alternatively, the coconut husk material, particularly the coir dust (as defined below), can be first scattered over the petroleum product film, whereby many separate particles of saturated dust will result if the film is thin. These can be pushed together into a mass by the chemical compression agent.

Coconut husk material

The material contemplated by the term "coconut husk material" falls into three classifications: The portion known as "bristle fiber" constitutes about 10 percent by volume of the coconut husk and can be used to form ropes, carpets, twine, doormats, brushes, and the like; the portion of the coconut husk known as "mattress fiber" constitutes about 20 percent by volume of the coconut husk and, as the name implies, is useful as a mattress filler; the largest portion of the coconut husk (about 70 percent by volume) is composed of material known as "coir dust" and "shorts." These materials are waste material (collectively referred to herein as coconut husk waste material) having (1) very short fibers known as "shorts" and (2) particulate matter approximating dust in its size distribution and known as "coir dust." Table I, set forth below, gives a sieve analysis of a typical coir dust.

TABLE I

Sieve analysis of coir dust

| Retained on U.S. Standard— | Wt. percent |
|---|---|
| 35-mesh screen | 29.2 |
| 60-mesh screen | 24.6 |
| 100-mesh screen | 23.7 |
| 200-mesh screen | 17.6 |
| Passing through on U.S. Standard 200-mesh screen | 4.9 |
| | 100.0 |

It should be noted that when the term "coconut husk material" is used, it is meant the product obtained after treatment of the husks to break up the husks' structure into fibrous material and coir dust.

The preferred portion of the coconut husk, for purposes of this invention, is the coconut waste material and more preferably, the coir dust. However, any portion of the coconut husk can be used, including mixtures of the bristle fiber and mattress fiber, and mixtures of coir dust and shorts with the other classes of material.

The coconut husk material can be spread on the spill by hand where the spill is small enough. For larger spills, and particularly on fresh or salt water, the coconut husk material may be spread by means of helicopter or blown on the slick by mechanical means. A particularly useful method is to blow the coconut husk material onto the surface from a boat using equipment similar to that for applying agricultural dust to plants and trees.

The rate of application of the coconut husk material is dependent upon the nature of the spill. Obviously, more of the absorbing material is needed where the spill is heavy. From about 0.1 to 1 part by weight of coconut husk material is preferably used per 1 part by weight of petroleum product. Preferably, from about 0.15 to 0.30 part by weight of coconut husk material is used per part by weight of petroleum product.

The coagulated slick forms a "rigid" structure or structures which can be readily harvested by mechanical means such as sieve-type devices and the like. The material can also be collected by hand where the spill is relatively minor. By "rigid" is meant that the slick or portions of it can be made to move as a single body. The slick has acquired characteristics of a solid unitary mass, that is, by pushing on one part of the rigid structure, the slick can be made to move.

The following examples are offered by way of illustration and not by way of limitation. All parts are by weight unless otherwise specified.

Example 1

The oil-absorbing efficiency of a number of materials was tested by the following procedure: Into a cylinder 3 inches long and 1 inch in diameter, prepared from a 100-mesh screen of brass and having a removable top prepared from the same screen, was placed a weighed amount of absorbent to a height of 2 inches. The cylinder was then immersed for 15 minutes in Trading Bay, Alaska, crude oil (36° API gravity).

The cylinder was then removed from the oil and drained for 15 minutes. After the 15-minute drain period, the cylinder was weighed. The increase in weight of the cylinder was taken to be the weight of the absorbed oil. The grams of oil absorbed were then divided by the grams of absorbent to determine the oil-absorbing efficiency of the test material. Table II below shows the results obtained from a variety of materials.

TABLE II

Oil spill clean-up absorbents

| Material: | Oil absorbing efficiency grams oil/gram absorbent |
|---|---|
| Straw | 2.2 |
| Peanut shells (dust and fiber) | 1.8 |
| Rice hulls | 1.2 |
| Excelsior (wood fibers) | 2.2 |
| Coconut husk waste material (mixture of short fiber and coir dust) | 5.0 |
| Coconut husk waste material (short fiber only) | 4.7 |
| Coconut husk waste material (coir dust only) | 6.7 |

Example 2

0.10 gram Arabian light crude oil was spread on fresh water in an 800 ml. beaker. 95 percent of the surface was covered with a light film. About 0.02 gram coconut husk waste material (about 75 percent by volume coir dust) and 25 percent by volume shorts was sprinkled uniformly over the oil film. Mild agitation resulted in absorption of all of the oil film. Addition of about 0.01 gram of N,N-dimethyl lauramide to the water surface pushed the particles together into a rigid structure which could easily be removed from the water surface with a screen leaving the water clear and oil-free.

Example 3

Arabian light crude oil in an amount of 0.82 gram was applied to the surface of fresh water in an 800 ml. beaker. The coconut husk waste material of Example 2 was sprinkled uniformly over the oil film until complete absorption of the oil was completed. This required 0.21 gram of the coconut husk waste material. Agitation of the surface by rocking the beaker brought the small particles together into 4 or 5 clumps about ¾" in diameter, having a rigid structure which were easily lifted out with a spatula leaving clear oil-free water where those removed had been. Addition of 0.02 gram of N,N-dimethyl lauramide to the water surface forced the remaining clumps and particles of oil-soaked coconut husk waste material together into a single mass.

Example 4

10.38 grams Arabian light crude oil was applied to the surface of fresh water in an 800 ml. beaker. The coconut husk waste material of Example 2 was uniformly sprinkled on the oil surface until a rigid mass was formed and the oil had begun to contract (100 percent of water area initially covered by the oil) so that a 10 percent clear, oil-free water surface surrounded the mass. This required 2.06 grams of coconut husk waste material. Mild agitation of the mass by shaking the beaker resulted in further consolidation of the mass so that only about 70 percent of the total water surface was covered by the mass. The remaining 30 percent of the water surface was clear and oil-free. This mass was removed easily by lifting with a spatula leaving the surface oil-free.

Example 5

3.56 grams of Chevon Thinner 350H (having 7.5 percent by volume aromatics, 62.5 percent naphthenes, 30 percent paraffins, an initial boiling point of 314° F. and a dry point of 400° F.) was spread on 700 ml. of fresh water in an 800 ml. beaker. The coconut husk waste material of Example 2 was scattered over the surface until all the thinner was absorbed into a solid-like mass that could be mechanically removed from the water by lifting with a spatula, leaving the water surface essentially thinner-free. 0.75 gram coconut waste was required for this.

It is apparent that many widely different embodiments of this invention may be made without departing from the scope and spirit thereof; and, therefore, it is not intended to be limited except as indicated in the appended claims.

I claim:

1. A process for treating petroleum product spills comprising applying to at least a portion of said petroleum product spill an effective amount of an absorbent material, causing said petroleum product spill to coagulate forming a rigid structure, said absorbent material consisting essentially of coir dust, coconut husk short fibers, or mixtures thereof.

2. The process of claim 1, wherein said absorbent material is applied at a rate of from 0.1 to 1 part by weight of said absorbent material per 1 part by weight of said petroleum product.

3. The process of claim 1, wherein said absorbent material is used at a rate of from about 0.15 to 0.30 part by weight of said absorbent material per 1 part of said petroleum product.

4. A process for treating a petroleum product slick on fresh or salt water comprising contacting at least a portion of said petroleum product slick with an absorbent material, causing said portion of said petroleum product slick to coagulate forming a rigid structure, said absorbent material consisting essentially of coir dust, coconut husk short fibers, or mixtures thereof.

5. The process of claim 4, wherein said absorbent material consists essentially of coir dust.

6. The process of claim 4, wherein said absorbent material is applied at a rate of from 0.1 to 1 part by weight of said absorbent material per 1 part by weight of said petroleum product.

7. The process of claim 6, wherein said petroleum product is crude oil.

8. The process of claim 4, wherein said petroleum product is crude oil.

9. The process of claim 4, wherein a chemical compression agent is applied to at least a portion of the perimeter of said petroleum product spill to compress said petroleum product spill into a smaller area prior to contacting said petroleum product spill with said absorbent material.

10. The process of claim 4, wherein a chemical compression agent is applied to at least a portion of the perimeter of said petroleum product slick after said petroleum product slick has been contacted with said absorbent material.

References Cited

UNITED STATES PATENTS

| 3,536,615 | 10/1970 | Bunn | 210—36 |
| 3,577,340 | 5/1971 | Paviak et al. | 210—42 |

OTHER REFERENCES

William D. Garrett et al., "Factors Affecting the Use of Monomolecular Surface Films to Control Oil Pollution on Water," Environmental Science & Technology, vol. 4, No. 2, February 1970, pp. 123–127.

REUBEN FRIEDMAN, Primary Examiner

T. G. WYSE, Assistant Examiner

U.S. Cl. X.R.

210—DIG 21